No. 879,931. PATENTED FEB. 25, 1908.
G. M. WESTMAN.
PROCESS OF REDUCING ARSENICAL ORES.
APPLICATION FILED MAY 24, 1906. RENEWED JUNE 26, 1907.
2 SHEETS—SHEET 1.
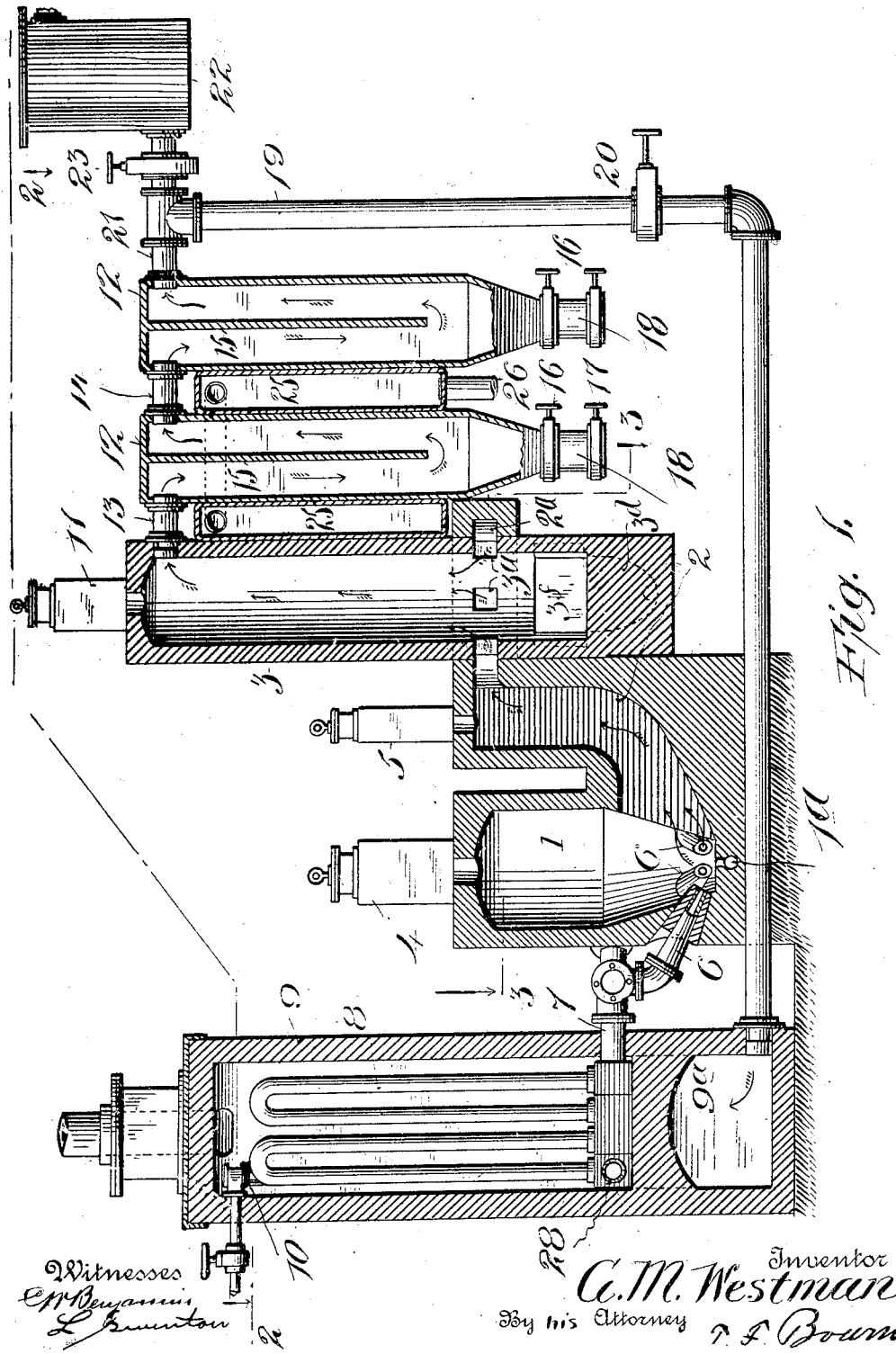

No. 879,931. PATENTED FEB. 25, 1908.
G. M. WESTMAN.
PROCESS OF REDUCING ARSENICAL ORES.
APPLICATION FILED MAY 24, 1906. RENEWED JUNE 26, 1907.
2 SHEETS—SHEET 2.
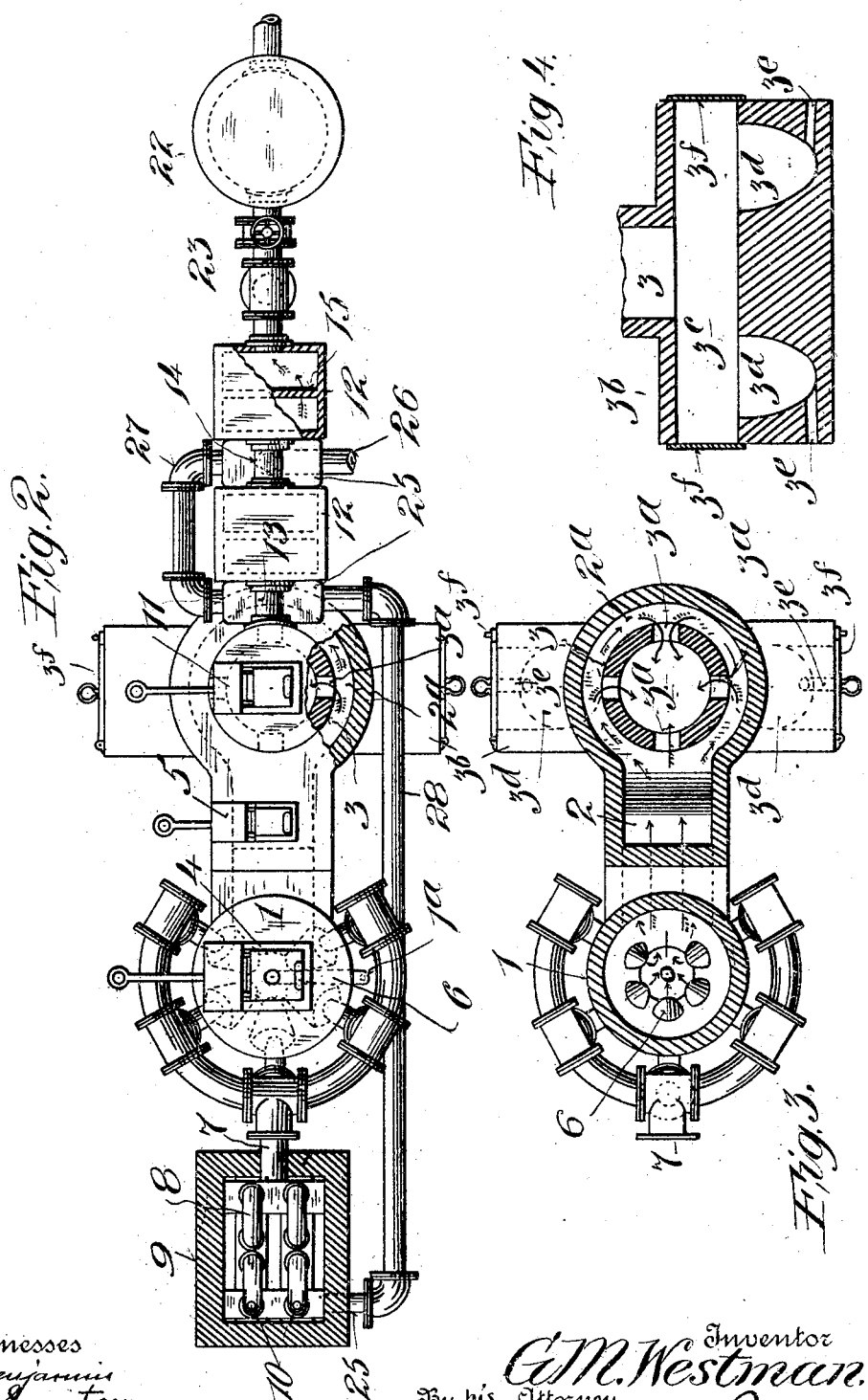

UNITED STATES PATENT OFFICE.

GUSTAF M. WESTMAN, OF NEW YORK, N. Y.

PROCESS OF REDUCING ARSENICAL ORES.

No. 879,931.  Specification of Letters Patent.  Patented Feb. 25, 1908.

Application filed May 24, 1906. Serial No. 318,466. Renewed June 26, 1907. Serial No. 380,908.

*To all whom it may concern:*

Be it known that I, GUSTAF M. WESTMAN, a subject of the King of Sweden, residing in New York city, borough of Manhattan, New York, have invented certain new and useful Improvements in Processes of Reducing Arsenical Ores, of which the following is a specification.

The object of my invention is to produce metallic arsenic from arsenical ores by subjecting the latter to the action of highly heated reductive gases.

In carrying out my invention I pass through the arsenical ores highly heated reductive gases containing carbon monoxid and hydrogen, and the arsenical vapors thus caused to pass from the ores are condensed into a solid or metallic form, and the remaining matte may be treated for the recovery of iron, silver, nickel, cobalt, or other elements remaining therein. By having the temperature of the reductive gases sufficiently high no combination between the arsenic and the hydrogen can take place. To produce the requisite highly heated reductive gases for action upon the arsenical ores, air mixed with water or steam under pressure may be driven through incandescent carbon, such as glowing coke, whereby the gases passing from the glowing coke will contain carbon monoxid and hydrogen, and such gases are then passed through the arsenical ores, and the resultant gases carrying off arsenical vapors are then condensed. Such condensing may be accomplished by air under pressure circulating around the arsenical vapor condenser, and for economizing heat, such air heated by passing around the condenser may be utilized by forcing it through the glowing coke. To aid in heating the air and steam or water mixture, the gases that remain after condensation of the arsenical vapors may be employed in a heater having pipes for the passage of the air and water or steam mixture, and the remaining gases may be passed over iron oxid to remove sulfur from such gases.

In the accompanying drawings I have illustrated an apparatus in which my improved process of producing metallic arsenic may be carried out, and wherein Figure 1 is a central sectional view of the same, Fig. 2 is a plan view, partly in section on the line 2, 2, in Fig. 1, Fig. 3 is a section substantially on the plane of the line 3, 3, in Fig. 1; and Fig. 4 is a detail section through the forehearth.

At 1 is indicated a suitable gas producer, shown connected by a channel 2 with a reducing furnace 3 in which the arsenical ores are to be treated. The channel 2 is shown extended around a portion of furnace 3, as at $2^a$, and a series of openings $3^a$ permit gases to pass from the channel 2, $2^a$ into the furnace 3 at various points. The forehearth $3^b$ at the bottom of the furnace is shown provided with a chamber $3^c$ communicating with pockets $3^d$ to receive liquid from the ores in furnace 3, which may be drawn off through outlets $3^e$, and chamber $3^c$ is provided with doors $3^f$ through which solid matter may be drawn as required.

At 4, 5, are suitable hoppers communicating with gas producer 1 and channel 2 through which coke may be introduced, the hopper being shown above the gas producer 1 and channel 2 to permit the ready introduction of the fuel therein. Heated air mixed with water or steam are forced into the lower part of gas producer 1, as through twyers 6 communicating with a pipe 7. The pipe 7 is shown connected with heating pipes or coil 8 located in a heater or chamber 9, and at 10 is a water supply pipe communicating with pipe 8, and it may be provided with a spray to inject water into the air forced through the twyers. The gas producer 1 may be provided with a draw-off outlet or the like $1^a$, for the removal of slag, etc. The ore reducing furnace 3 is shown provided at the top with a suitable hopper 11 through which the arsenical ores may be introduced.

At 12 are condensers for the arsenical vapors that pass from furnace 3, the pipe 13 connecting the upper part of furnace 3 with the upper part of the adjacent condenser, and where more than one condenser is used, the upper parts of said condensers may be connected by pipe 14. Within the condensers are partitions 15 extending downwardly from the upper part to cause the gases to take a downward and upward course through the condensers, as shown by the arrows in Fig. 1.

At 16, 17 are draw off valves at the lower part of the condensers to permit the removal of metallic arsenic from the condensers while the process continues, whereby the valve 17 may be closed and the valve 16 opened to admit the arsenic into the chamber 18, and then the valve 16 may be closed and the valve 17 opened, whereby the escape of vapors during the removal of the arsenic is prevented. The gases passing from the condenser or condensers may be conducted by pipe 19 having a controlling valve 20 to the combustion chamber $9^a$ of the heater 9 to be utilized in heating the pipes 8. Outlet pipe 21 from the condenser may also be connected with a chamber 22, containing layers of oxid of iron for removing the sulfur from the gases, the passage being controlled by a valve 23.

One or more of the condensers 12 are surrounded by or associated with one or more jackets or chambers 25 through which air may be circulated to cool the condensers. I have shown the jackets or chambers 25 connected with a supply pipe 26, which may be connected with a blower or pump in any suitable manner, and said jackets are shown connected at their upper ends by a pipe 27. To utilize the heat absorbed by the fluid passing through the jackets or chambers 25 I connect one of the latter, as by pipe 28, with the coil or pipe 8, so that when air is forced through said jackets it will become heated, and such heated air may be forced through coil or pipe 8 for further heating the air blast, thence through the twyers into the gas producer to be converted into reductive gases for reducing the arsenical ores in the furnace 3.

In carrying out my improved process the arsenical ores are filled into the furnace 3, and coke is filled into the gas producer 1 and channel 2. The coke is first heated to incandescence in any suitable manner. The heated air mixed with a suitable proportion of water or steam is driven from the twyers 6 through the glowing coke, whereby gases containing carbon monoxid and hydrogen are produced and forced into the furnace 3 and thus through the arsenical ores at high temperature, thereby volatilizing the arsenic, the vapor of which will be condensed within the condensers 12 and may be removed as required through the valve devices 16, 17. The gases are then partly conducted through pipe 19 to the combustion chamber $9^a$ for heating the coil or pipe 8, and the remainder of the gases are passed over iron oxid in chamber 22 to be freed from sulfur, and may be used for any desired purpose.

If the arsenical ores to be reduced are mispickle (FeAsS) the arsenic will volatilize by reason of the hot reductive gases passing through the ores. The arsenical vapors which pass over into the condensers with the gases are condensed when the temperature of the gases sinks, as in the vessel through which they pass. No combination between arsenic and hydrogen can take place at the high temperature existing in the furnace.

If the ores to be treated contain $FeAs_2$, as much yellow pyrites ($FeS_2$) must be added to expel the arsenic as that the final matte will consist of simple sulfurets of iron. There is also another form of ore, namely, $Ag_3As + FeAs_2$, which should be mixed with $FeS_2$, before heating the same, may be used, by which operation the arsenic is expelled and partly replaced by sulfur. By subjecting to the process the last named sample of ore after being sulfureted the action of hydrogen will be according to the following formula, viz; $Ag_2S + H_2 = H_2S + 2Ag$. If instead of iron, nickel or cobalt be in the ores, the treatment will be the same as where the iron is present. The liquid matter collected in the pockets $3^d$ may be drawn out through outlets $3^e$ and solid matter from space $3^c$ as desired, while the process continues. The gases, after the arsenic is condensed, are partly passed to the heater where they are burned, but the balance is passed over oxid of iron to be purified from sulfur in $H_2S$— depending on the purpose for which they may be used.

In producing the reductive gases I preferably introduce water into the air passing to the gas producer, which mixture is subsequently raised to a temperature sufficient to convert the water into steam, and in practically carrying out the process the temperature of the mixture of air and steam should be raised sufficiently high to cause the reductive gases passing from the glowing coke to melt the ores and liberate the arsenic therefrom. A suitable quantity of water should be introduced into the air passing to the twyers in order to obtain as large a proportion of hydrogen as possible, and yet the proportion of air should be sufficiently great to maintain the reductive gases at proper temperature to reduce the ores. I have described the use of glowing coke through which the mixture of air and steam is passed as a convenient means for producing carbon monoxid and hydrogen in the reductive gases. The arsenical ores mixed or not mixed with yellow pyrites, will preferably be formed into briquets.

By means of my improved process metallic arsenic may be produced from arsenical ores wholly within a closed apparatus, without danger of escape of arsenical or other injurious gases, and the process can be carried on cheaply and continuously, drawing off the remainder as required, and introducing new charges of coke and ores into their respective chambers.

Having now described my invention what I claim is:

1. The process of producing metallic arsenic consisting in subjecting arsenical ores to the action of heated reductive gases, and then condensing the arsenical vapors passing from said ores.

2. The process of producing metallic arsenic consisting in passing heated reductive gases containing carbon monoxid and hydrogen through arsenical ores, and then condensing the arsenical vapors passing from said ores.

3. The process of producing metallic arsenic consisting in producing reductive gases containing carbon monoxid and hydrogen in a heated state, passing said gases through arsenical ores, and condensing the arsenical vapors passing from said ores.

4. The process of producing metallic arsenic consisting in passing air mixed with steam through glowing coke to form reductive gases containing carbon monoxid and hydrogen, subjecting arsenical ores to contact with said reductive gases and producing arsenical vapors, and condensing said vapors.

5. The process of producing metallic arsenic consisting in passing a heated mixture of air and steam through glowing coke to form carbon monoxid and hydrogen, passing said gases through arsenical ores to produce arsenical vapors, and then condensing said vapors.

6. The process of producing arsenic consisting in passing heated gases containing carbon monoxid and hydrogen through arsenical ores, passing the arsenical vapors from said ores through a condenser, circulating air in proximity to said condenser to cause condensation of the arsenical vapors therein and causing said air to absorb heat from said gases, and then passing said heated air through incandescent carbon to said ores.

7. The process of producing metallic arsenic consisting in heating a mixture of air and steam, passing said mixture through incandescent carbon to produce reductive gases containing carbon monoxid and hydrogen, passing said gases through arsenical ores and producing arsenical vapors, and then condensing said vapors.

GUSTAF M. WESTMAN.

Witnesses:
T. F. BOURNE,
L. SWINTON